(12) United States Patent
Brownrigg, Jr.

(10) Patent No.: US 8,301,775 B2
(45) Date of Patent: Oct. 30, 2012

(54) AFFILIATE BANDWIDTH MANAGEMENT

(75) Inventor: Richard T. Brownrigg, Jr., Castle Rock, CO (US)

(73) Assignee: Starz Entertainment, LLC, Englewood, CO (US)

( * ) Notice: Subject to any disclaimer, the term of this patent is extended or adjusted under 35 U.S.C. 154(b) by 128 days.

(21) Appl. No.: 11/956,566

(22) Filed: Dec. 14, 2007

(65) Prior Publication Data

US 2008/0320141 A1      Dec. 25, 2008

Related U.S. Application Data

(60) Provisional application No. 60/870,131, filed on Dec. 15, 2006.

(51) Int. Cl.
*G06F 15/173* (2006.01)
(52) U.S. Cl. .................... 709/226; 709/201; 709/223
(58) Field of Classification Search .................. 709/226
See application file for complete search history.

(56) References Cited

U.S. PATENT DOCUMENTS

| | | | | |
|---|---|---|---|---|
| 6,785,704 | B1* | 8/2004 | McCanne | 709/225 |
| 7,099,936 | B2* | 8/2006 | Chase et al. | 709/223 |
| 7,706,280 | B2* | 4/2010 | Raciborski et al. | 370/237 |
| 2002/0131496 | A1* | 9/2002 | Vasudevan et al. | 375/240.11 |
| 2003/0187970 | A1* | 10/2003 | Chase et al. | 709/223 |
| 2003/0229595 | A1* | 12/2003 | Mononen et al. | 705/63 |
| 2004/0117427 | A1* | 6/2004 | Allen et al. | 709/200 |
| 2005/0027700 | A1* | 2/2005 | Turner et al. | 707/3 |
| 2007/0025254 | A1* | 2/2007 | Raciborski et al. | 370/235 |
| 2007/0025327 | A1* | 2/2007 | Raciborski et al. | 370/351 |
| 2007/0067425 | A1* | 3/2007 | McKinney | 709/223 |
| 2007/0220587 | A1* | 9/2007 | Loyer | 726/1 |
| 2007/0299789 | A1* | 12/2007 | Young | 705/400 |
| 2008/0141328 | A1* | 6/2008 | Weintraub et al. | 725/134 |
| 2011/0191449 | A1* | 8/2011 | Swildens et al. | 709/219 |

OTHER PUBLICATIONS

Adler, Algorithms for Optimizing Bandwidth Costs on the Internet, 2006 1st IEEE Workshop on Hot Topics in Web Systems and Technologies, HotWeb, 2006. http://people.cs.umass.edu/~ramesh/Site/PUBLICATIONS_files/ASV06.pdf.*

* cited by examiner

*Primary Examiner* — Dohm Chankong
*Assistant Examiner* — Neeraj Utreja
(74) *Attorney, Agent, or Firm* — Kilpatrick Townsend & Stockton LLP (57) ABSTRACT

Methods, systems, and machine readable media are disclosed for managing bandwidth usage of a content provider. According to one embodiment, a system for managing bandwidth usage of a content provider can comprise a content provider system adapted to maintain and provide content and a first affiliate system comprising an affiliate network, an affiliate server communicatively coupled with the affiliate network, and a client. The client can be adapted to selectively request the content from either the content provider system or the affiliate server of the first affiliate system based on bandwidth costs for the content provider system.

24 Claims, 5 Drawing Sheets

AFFILIATE BANDWIDTH MANAGEMENT

CROSS-REFERENCES TO RELATED APPLICATIONS

This application claims the benefit of U.S. Provisional Application No. 60/870,131, filed Dec. 15, 2006, entitled AFFILIATE BANDWIDTH MANAGEMENT, the complete disclosures of which is incorporated herein by reference for all purposes.

BACKGROUND OF THE INVENTION

Embodiments of the present invention relate generally to distribution of content and more particularly to managing bandwidth usage of a content provider.

Content providers can provide various types of services and content available for download to a number of subscribers or users over one or more networks including the Internet and various other types of local area and wide area networks, wired and wireless networks. Content distributed by these content providers can include audio, video, various types of web or other services, etc. Some content providers distribute content via networks which the do not own or control. For example, some content providers utilize the Internet or other network for which they pay a fee charged based on bandwidth used. Other content providers maintain networks which they own and/or control and therefore do not pay a usage fee per se.

In some cases, it may be beneficial for these different content providers to share resources such that one content provider can utilize the network and/or systems maintained by another. However, even if such an agreement can be made, there is no effective way for clients of the content providers to download content from select locations based on the cost of those downloads to the content providers or in light of these agreements. Hence, there is a need in the art for improved methods and systems for managing bandwidth usage of a content provider.

BRIEF SUMMARY OF THE INVENTION

Methods, systems, and machine readable media are disclosed for managing bandwidth usage of a content provider. According to one embodiment, a system for managing bandwidth usage of a content provider can comprise a content provider system adapted to maintain and provide content and a first affiliate system comprising an affiliate network, an affiliate server communicatively coupled with the affiliate network, and a client. The client can be adapted to selectively request the content from either the content provider system or the affiliate server of the first affiliate system based on bandwidth costs for the content provider system.

In some cases, the first affiliate system can be adapted to maintain a copy of the content and the client can be adapted to request the content from the affiliate server of the first affiliate system if the client is connected with the affiliate network of the first affiliate system. Alternatively, the client can be adapted to request the content from the content provider if the client is connected with a network other than the affiliate network.

In some cases, the system can further comprise a second affiliate system. The second affiliate system can comprise an affiliate network and an affiliate server communicatively coupled with the affiliate network and adapted to maintain a copy of the content. The client can be adapted to request the content from the affiliate server of the second affiliate system if the client is connected with the affiliate network of the second affiliate system. Alternatively, the client can be adapted to request the content from the affiliate server of the second affiliate system if the client is connected with a network other than the affiliate network of the first affiliate system. According to another alternative, the client can be adapted to request the content from the content provider system if the client is connected with a network other than the affiliate network of the first affiliate system. According to yet another alternative, the client can be adapted to request the content from the content provider system if the client is connected with a network other than the affiliate network of the first affiliate system and the affiliate network of the second affiliate system.

According to another embodiment, a method of managing bandwidth usage of a content provider can comprise identifying a location for retrieving content based on a bandwidth cost to the content provider and retrieving the content from the determined location. For example, the location can comprise a content provider system. In some cases, prior to identifying the location for retrieving the content, a copy of the content can be cached on an affiliate server of the affiliate system. In such a case, the location can comprise the affiliate server of the affiliate system.

Identifying the location for retrieving content can further comprise determining one or more current network connections, identifying a plurality of locations of the content, determining a bandwidth cost to the content provider of retrieving the content from each of the plurality of locations, and retrieving the content from the location having the least bandwidth cost to the content provider. Retrieving the content from the location having the least bandwidth cost to the content provider can comprise retrieving the content from a content provider system, from a content provider system via an affiliate system, or from an affiliate server of an affiliate system.

According to yet another embodiment, a machine-readable medium can have stored thereon a series of instructions which, when executed by a processor, cause the processor to manage bandwidth usage of a content provider by identifying a location for retrieving content based on a bandwidth cost to the content provider and retrieving the content from the determined location. For example, the location can comprise a content provider system. In some cases, prior to identifying the location for retrieving the content, a copy of the content can be cached on an affiliate server of the affiliate system. In such a case, the location can comprise the affiliate server of the affiliate system.

Identifying the location for retrieving content can further comprise determining one or more current network connections, identifying a plurality of locations of the content, determining a bandwidth cost to the content provider of retrieving the content from each of the plurality of locations, and retrieving the content from the location having the least bandwidth cost to the content provider. Retrieving the content from the location having the least bandwidth cost to the content provider can comprise retrieving the content from a content provider system, from a content provider system via an affiliate system, or from an affiliate server of an affiliate system.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Generally speaking, embodiments of the invention provide methods and systems for managing bandwidth usage of a content provider. For example, embodiment of the present invention may be useful for a provider of audio, video, and/or other multimedia content to a number of users and/or subscribers. Generally speaking, a content provider and an affiliate system can, perhaps based on a fee agreement or other business arrangement, agree to shift some of the costs of distributing content to a number of clients from the content provider to the affiliate system. For example, rather than distributing the content to the clients directly from the content provider over a network that causes the content provider to incur a cost, the content provider may provide the content to the affiliate for storage and distribution to the clients over a network that may be available to the affiliate system at little or no additional cost to the affiliate. In some cases, depending upon the agreement between the parties and possibly other conditions, the client can be adapted to request and receive the content from the content provider. In other cases, again depending upon the agreement between the parties and possibly other conditions, the client can be adapted to request and receive the content from the affiliate system. According to one embodiment, each client can be adapted to choose to request the content from either the content provider or the affiliate system based on a current network connection of the client and the costs of such a connection to the content provider. That is, the clients can be adapted to choose to request the content from a source that causes a lower bandwidth expense to be incurred by the content provider.

Figure 1:
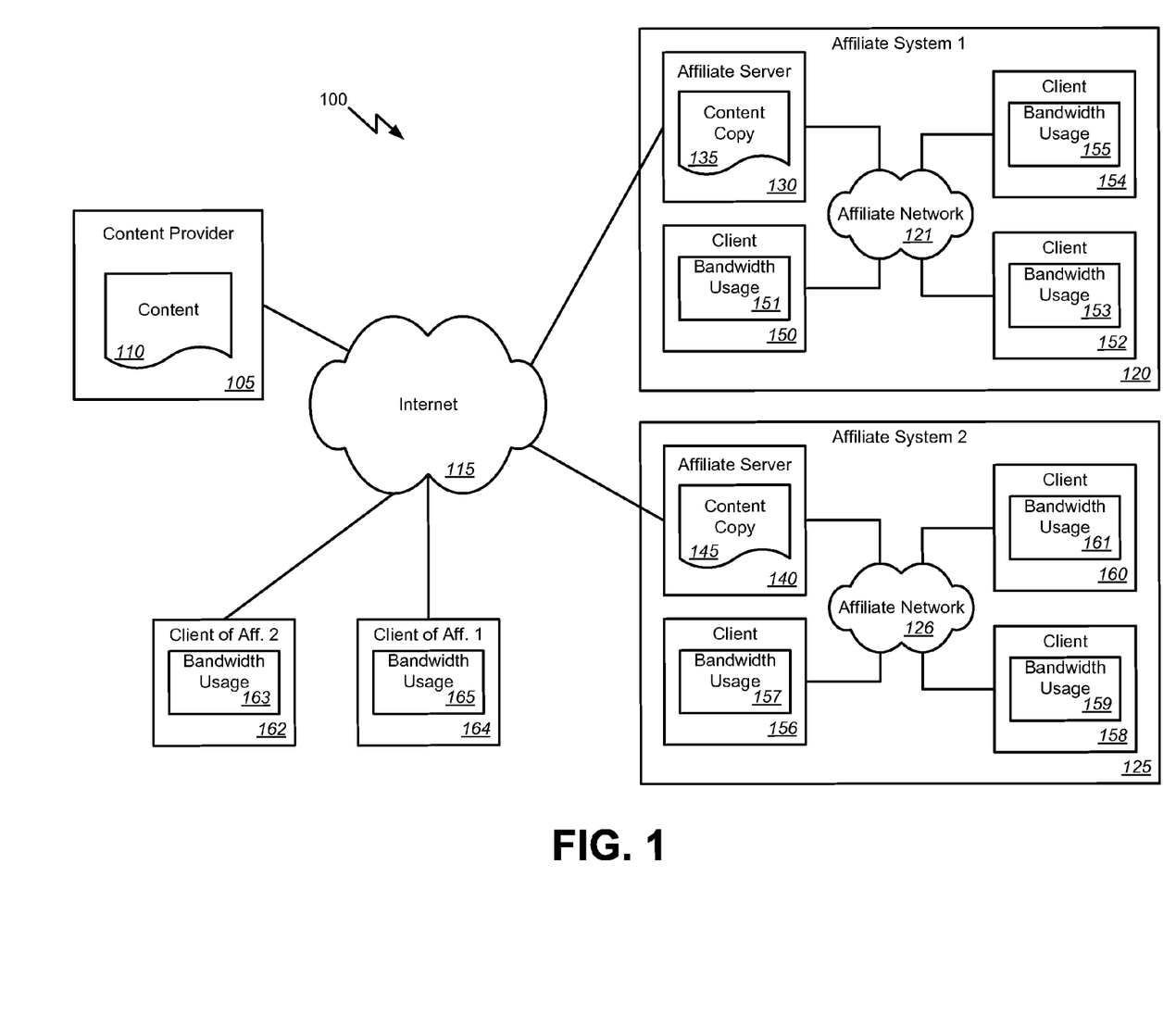
FIG. 1 is a block diagram illustrating a system for managing bandwidth usage of a content provider according to one embodiment of the present invention.

FIG. 1 is a block diagram illustrating a system for managing bandwidth usage of a content provider according to one embodiment of the present invention. According to one embodiment, the system 100 for managing bandwidth usage of a content provider can comprise a content provider system 105, e.g., a content delivery network (CDN) adapted to maintain and provide content 110 and a first affiliate system 120. The first affiliate system 120, e.g., another CDN, can comprise an affiliate network 121, an affiliate server 130 communicatively coupled with the affiliate network 121 and adapted to receive and maintain a copy of the content 135, and clients 150, 152, and 154. The clients 150, 152, and 154 can be adapted to request the content from either the content provider system 105, the affiliate server 130 of the first affiliate system, or from another source.

That is, depending upon the arrangements or agreements between the content provider and the affiliate, between the content provider and the client, and/or between the affiliate and the client, three models for distributing the content may be utilized. In one model, the clients 150, 152, and 154 of the affiliate system 120 can be adapted to retrieve the content 135 stored on the affiliate server 130 rather than from the content provider 105. For example, the affiliate system 120 may include a network 121 that is owned and operated by the affiliate and for which no additional bandwidth expenses are incurred for communications with the clients 150, 152, and 154. In such a case, the affiliate and the content provider may agree, perhaps for a fee paid by the content provider to the affiliate, to utilize this network 121 for distributing content to the clients 150, 152, and 154 from the affiliate server 130 rather than having the clients 150, 152, and 154 retrieve the content from the content provider 105 and possibly causing the content provider to incur bandwidth expenses for transmitting the content to the clients 150, 152, and 154 over a network such as the Internet 115. In another exemplary arrangement or agreement between the content provider and the affiliate, the affiliate may pay a reduce rate for the rights to sell the content of the content provider if the affiliate servers the content. This model may also apply to clients 164 of the affiliate system 120 connected to the affiliate network 121 via another network such as the Internet 115. That is, even if the client 164 is not directly connected to the affiliate network 121, the client can retrieve the content 135 from the affiliate server 130.

In another model, the clients 150, 152, 154, and 164 of an affiliate system 120 can be adapted to retrieve the content 110 from the content provider 105. That is, in this model, the clients 150, 152, 154, and 164 of an affiliate system 120, regardless of whether they are connected with the affiliate network 121 directly or via the Internet 115 or other network, can be adapted to retrieve the content 110 from the content provider 105. In such a case, the affiliate server 130 may or may not be adapted to maintain a copy of the content 135.

According to one embodiment, in the third model, the clients 150, 152, 154, and 164 of an affiliate can be adapted to selectively request the content from either the content provider 105 or the affiliate server 130 based on a current network connection of the client and bandwidth costs for the content provider system 105. That is, each client 150, 152, 154, and 164 can include a bandwidth usage module 151, 153, 155, and 165 adapted to detect a network connection the client 150, 152, 154, or 164 is currently using. The software bandwidth usage module 151, 153, 155, and 165 using a rule base logic and/or other information defining and/or identifying the locations for the content, the bandwidth cost associated with obtaining the content from each location, the agreement between the content provider and the affiliate, and/or other possible criteria or information, can identify and cause the client to request the content from the location that causes the least or lower cost to be incurred by the content provider.

So, for example, one client 154 can be adapted to request the content 135 from the affiliate server 130 of the first affiliate system 120 when the client 154 is connected with the affiliate network 121 of the first affiliate system 120. In another case, another client 164 can be adapted to request the content 110 from the content provider 105 if the client 164 is connected with the Internet 115.

According to one embodiment, the system 100 can further comprise a second affiliate system 125, e.g., another CDN. The second affiliate system 125 can also comprise an affiliate network 126 and an affiliate server 140 communicatively coupled with the affiliate network 126 and adapted to maintain a copy of the content 145. In such cases, clients 150, 152, 154, 156, 158, 160, 162, and 164 can be adapted to request the content from either the content provider system 105, the one of the affiliate servers 130 or 140, or from another source. That is, depending upon the model implemented, the clients can request and receive the content from a variety of source. Furthermore, it should be understood that the first affiliate system 120 and the second affiliate system 125, depending upon the agreements with the content provider, may implement different models.

According to a further embodiment, a client of one affiliate system may be adapted to request content from another affiliate system in some cases. So, for example, a client 164 can be adapted to request the content from any of the content provider system 105, the first affiliate system 120, or the second affiliate system 125 depending upon a current network connection of the client and bandwidth cost incurred by the content provider by such a request. That is, when a client is traveling or otherwise not connected with the affiliate network with which it is a member or subscriber, the client may be able to use the content provider or another affiliate to obtain the content. However, in such a case, the bandwidth available to the client could be limited. Additionally or alternatively, the affiliates may have roaming agreements to allow their users to use other affiliates or other systems.

For example, a client 156 can be adapted to request the content 145 from the affiliate server 140 of the second affiliate system 125 if the client 156 is connected with the affiliate network 126 of the second affiliate system 125. Alternatively, a client 164 can be adapted to request the content 145 from the affiliate server 140 of the second affiliate system 125 if the client is connected with the Internet 115. In yet other cases, a client 162 connected with the Internet 115 may be adapted to request the content from the first affiliate system 120 or the content provider 105 depending upon agreements between the affiliate systems 120 and 125, the content available on each system 120 and 125, and the bandwidth cost to be incurred by the content provider.

According to one embodiment, an affiliate system 120 may offer enhanced QoS, for example 50 MB/s, when providing content via the affiliate network 121. That is, an affiliate, in addition to being able to provide the content to clients connected with the affiliate network at little or no additional bandwidth costs, may be able to do so at higher speeds than may be available to the content provider system 105. Additionally, according to one embodiment, a higher-quality version of a program could be made available by the affiliate system when enhanced bandwidth is available.

Figure 2:
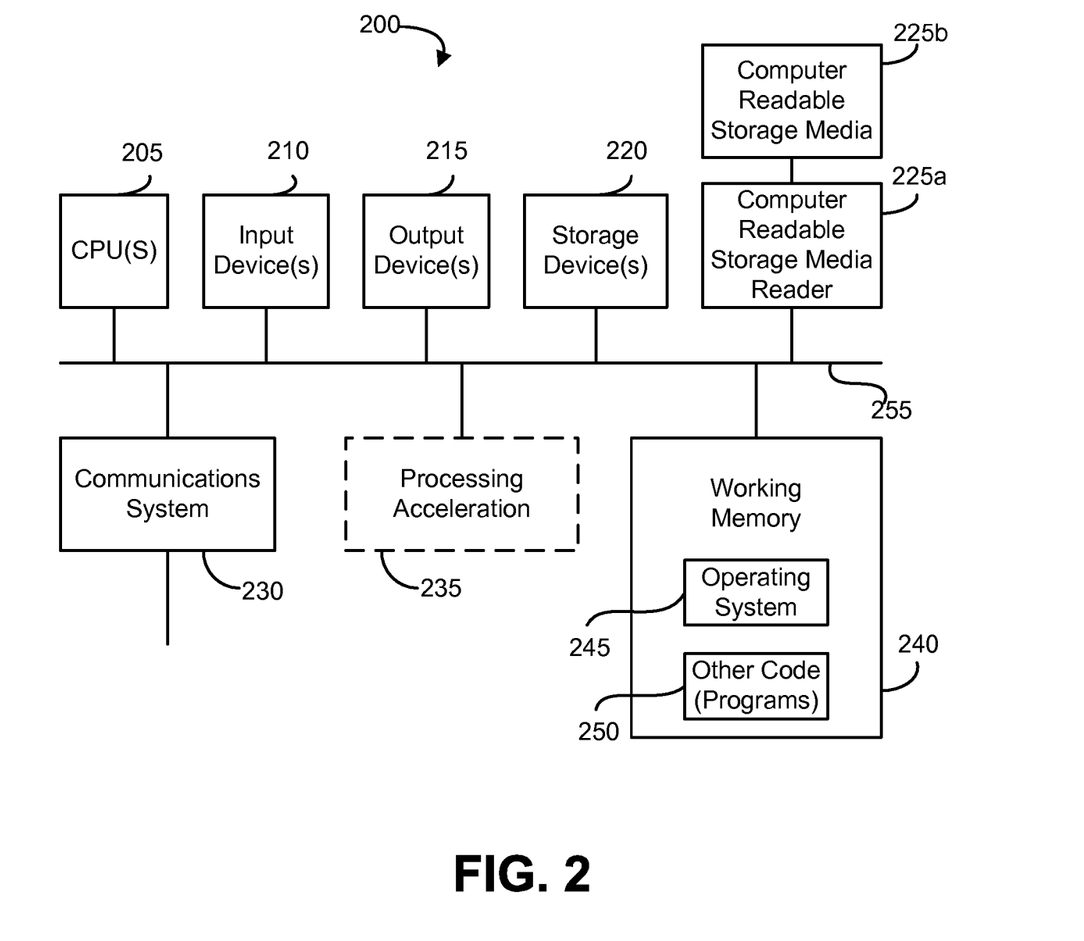
FIG. 2 is a block diagram illustrating an exemplary computer system upon which embodiments of the present invention may be implemented.

FIG. 2 is a block diagram illustrating components of an exemplary computer system upon which embodiments of the present invention may be implemented. For example, the system 200 illustrated here is thought to be adaptable for implementation of some or all of the content provider system 105, affiliate servers 130, and 140, clients 150, 152, 154, 156, 158, 160, 162, and 164, or other elements of the systems described above. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

As noted above, a content provider and an affiliate system can, perhaps based on a fee agreement or other business arrangement, agree to shift some of the costs of distributing content to a number of clients from the content provider to the affiliate system. For example, rather than distributing the content to the clients directly from the content provider over a network that causes the content provider to incur a cost, the content provider may provide the content to the affiliate for storage and distribution to the clients over a network that may be available to the affiliate system at little or no additional cost to the affiliate. In some cases, depending upon the agreement between the parties and possibly other conditions, the client can be adapted to request and receive the content from the content provider, from the affiliate system, or from either the content provider or the affiliate system based on a current network connection of the client and the costs of such a connection to the content provider. That is, the clients can be adapted to choose to request the content from a source that causes a lower bandwidth expense to be incurred by the content provider.

Figure 3:
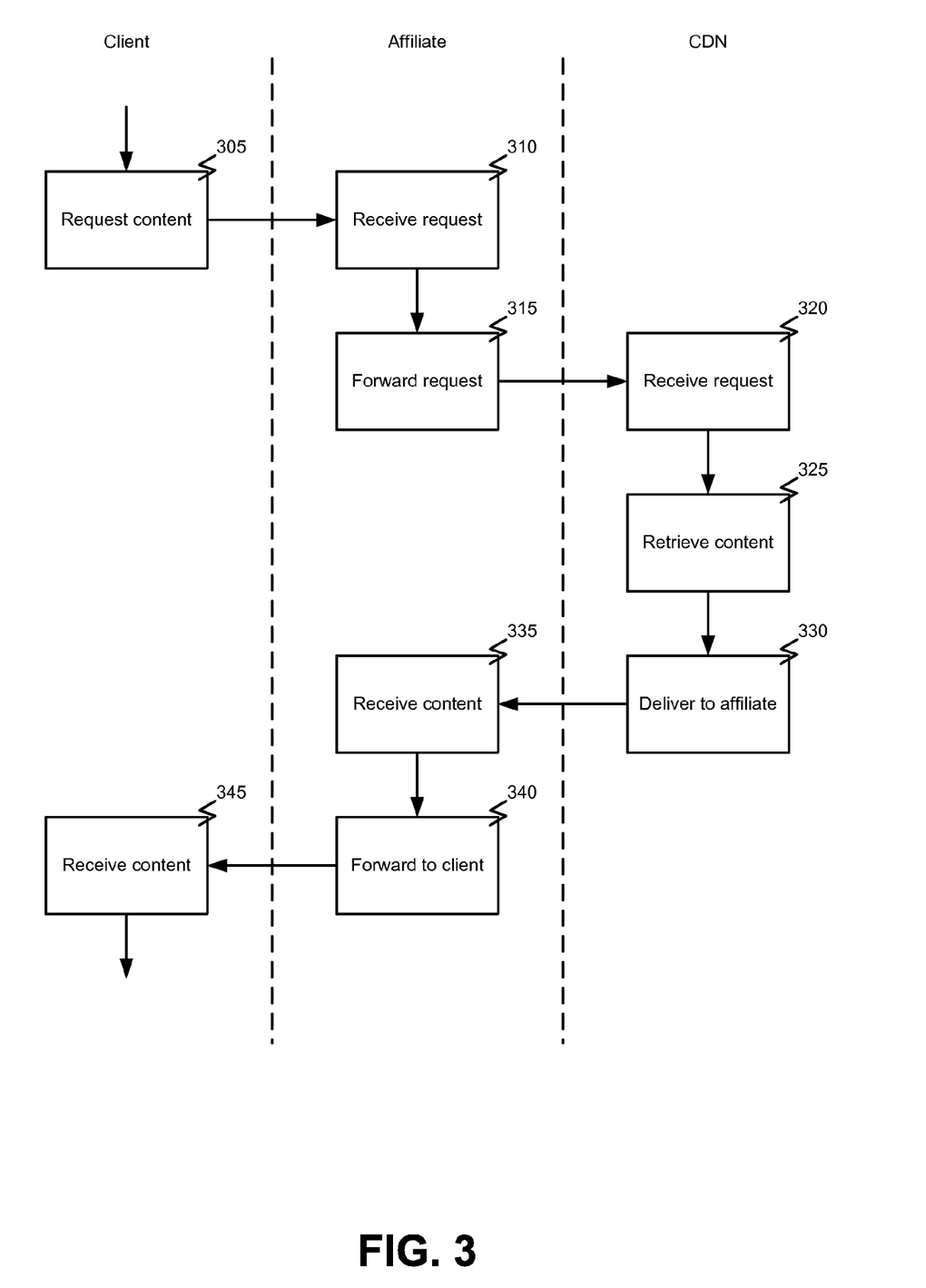
FIG. 3 is a flowchart illustrating a process for managing bandwidth usage of a content provider according to one embodiment of the present invention.

Thus, in one model, the clients of an affiliate system can be adapted to retrieve the content from the content provider. That is, in this model, the clients of an affiliate system, regardless of whether they are connected with the affiliate network directly or via the Internet or other network, can be adapted to retrieve the content from the content provider. In such a case, the affiliate server may or may not be adapted to maintain a copy of the content. FIG. 3 is a flowchart illustrating a process for managing bandwidth usage of a content provider according to this embodiment of the present invention.

In this example, the process begins with the client requesting 305 content. As illustrated here, the client can request 305 the content from the affiliate which can in turn receive 310 the request and forward 315 the request to the CDN. That is, the client can request 305 the content from the CDN via the affiliate system and/or network. However, it should be understood that alternatively, the client could request 305 the content directly from the CDN without involving the affiliate.

The CDN can receive the request 320, either from the client directly or from the client via the affiliate, retrieve 325 the requested content, and return or deliver 330 the content. As illustrated here, the CDN can deliver 335 the content to the affiliate. However, it should be understood that alternatively, the CDN can deliver 335 the content directly to the client. In the example illustrated here where the CDN delivers 335 the content to the affiliate, the affiliate can receive 340 the content from the CDN and forward 340 or deliver the content to the client. In some cases, the affiliate may forward 340 or deliver the content to the client without storing or caching a copy of the content. In other cases, depending upon the agreements between the affiliate and the CDN, the affiliate system may cache a copy of the content for later use in handling requests from clients. Regardless of whether the CDN delivers the content to the client directly or via the affiliate, the client can receive 345 the content for storage and/or consumption.

Figure 4:
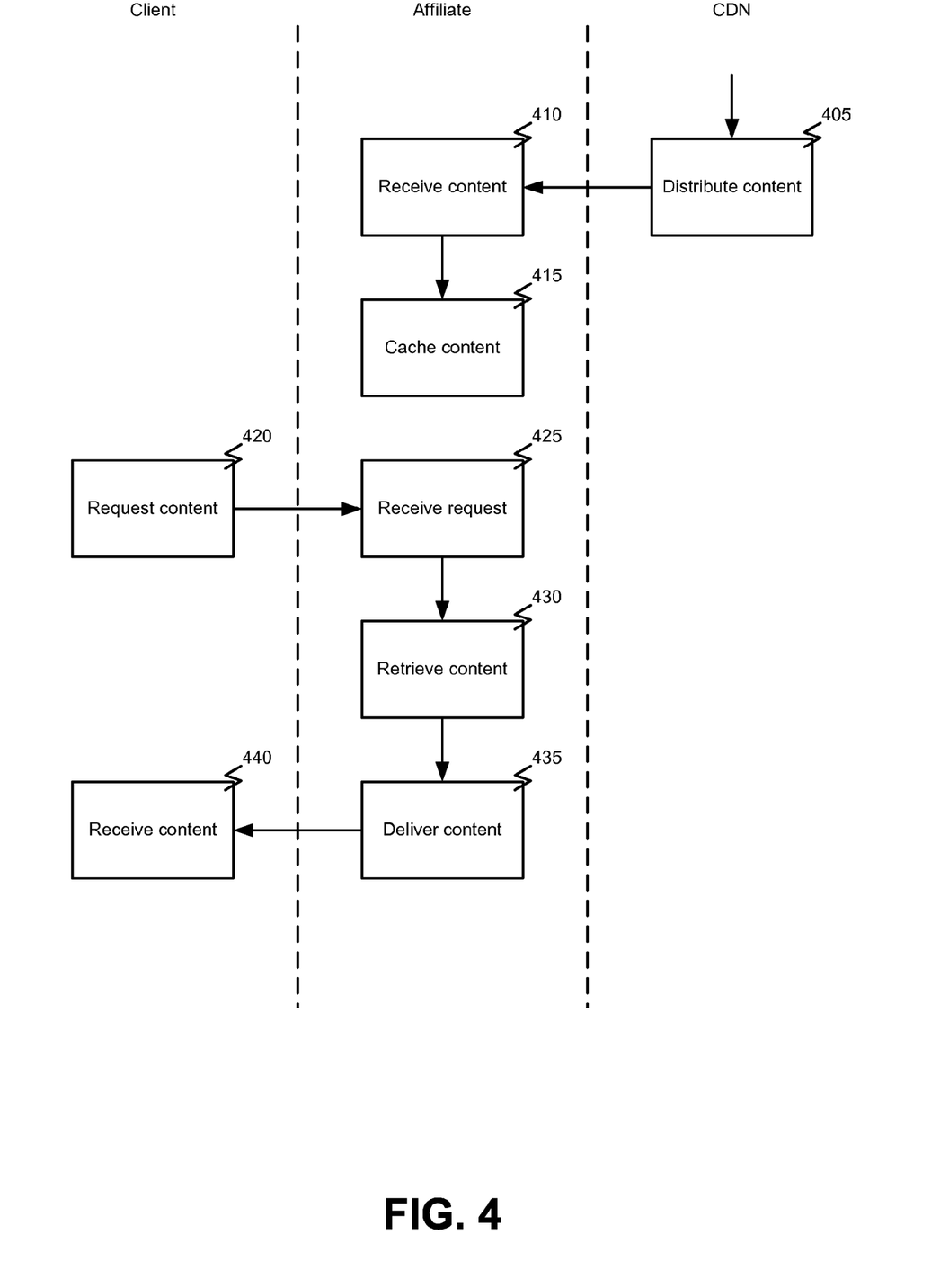
FIG. 4 is a flowchart illustrating a process for managing bandwidth usage of a content provider according to another embodiment of the present invention.

In another model, the clients of the affiliate system can be adapted to retrieve the content stored on the affiliate server rather than from the content provider. As noted above, this model may also apply to clients of the affiliate system connected to the affiliate network via another network such as the Internet. That is, even if the client is not directly connected to the affiliate network, the client can retrieve the content from the affiliate server thereby reducing the cost incurred by the CDN for delivering the content. FIG. 4 is a flowchart illustrating a process for managing bandwidth usage of a content provider according to this embodiment of the present invention.

In this example, the process begins with the CDN distributing 405 content to the affiliate. As noted above, this distribution 405 can be in response to a request for the content from a client. That is, content can be distributed 405 from the CDN to a client via the affiliate in response to the client requesting a particular content. Alternatively, distributing 405 content from the CDN to the affiliate can be performed on a period basis or in response to the occurrence of some condition or event. For example, new content can be periodically identified and pushed out to one or more affiliates by the CDN. In another example, the affiliate may request particular content.

Regardless of exactly how the distribution 405 is triggered, the affiliate can receive 410 and cache 415 the content. At some point in time after the content has been cached 415, one or more clients can request 420 the cached content. The affiliate can receive 425 the request, retrieve 435 the cached content, and deliver 435 the content to the requesting client. The client can receive 440 the content for storage and/or consumption.

Figure 5:
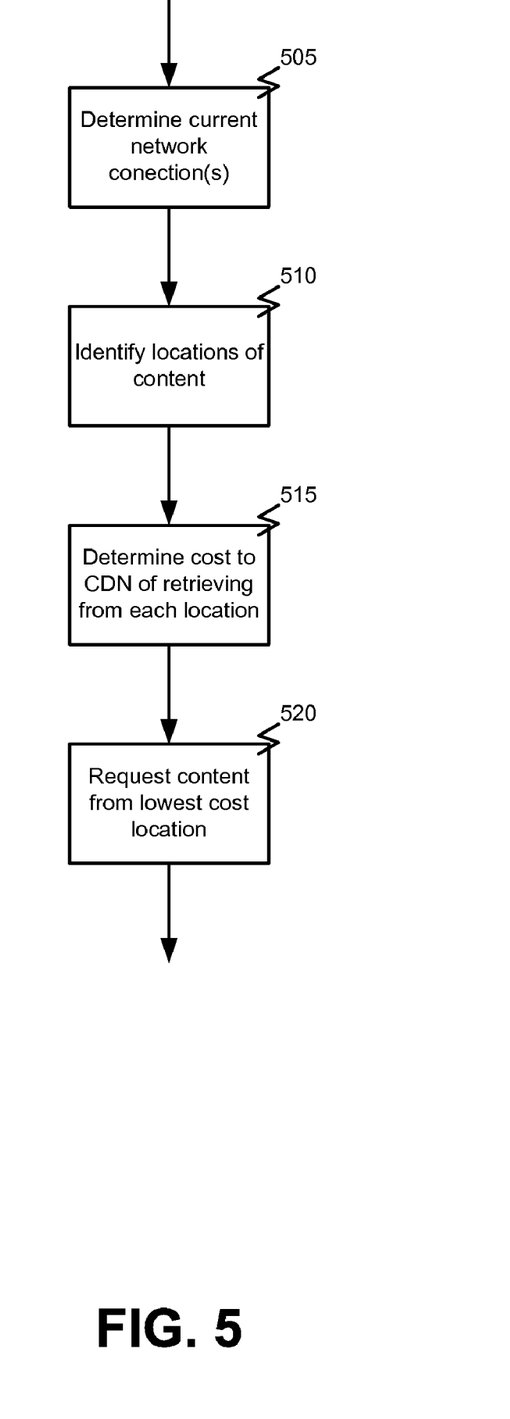
FIG. 5 is a flowchart illustrating a process for managing bandwidth usage of a content provider according to yet another embodiment of the present invention.

According to yet another embodiment, i.e., another model, the clients of an affiliate can be adapted to selectively request the content from either the content provider or the affiliate server based on a current network connection of the client and bandwidth costs for the content provider system. That is, each client can detect a current network connection and using a rule base logic and/or other information defining and/or identifying the locations for the content, the bandwidth cost associated with obtaining the content from each location, the agreement between the content provider and the affiliate, and/or other possible criteria or information, can identify and cause the client to request the content from the location that causes the least or lower cost to be incurred by the content provider. FIG. 5 is a flowchart illustrating a client process according to this embodiment of the present invention.

In this example, the process begins with the client determining 505 a current network connection. That is, the client can determine 505 whether is connected to one or more of the Internet, an affiliate network, or another network. It should be understood that this determination may identify more than one possible connections or more than one networks for a given connection. That is, the client may be connected to more than one network at any given time and the connection between the client and the affiliate and/or content provider may involve more than one network. For example, the may be connected to the affiliates network via a local wireless network. Additionally or alternatively, the client may be connected to the affiliate network and/or content provider via a wired or wireless Internet connection.

Once the client has determined 505 or identified current network connections, the client can then identify 510 one or more locations from which the desired content can be retrieved. Identifying 510 the one or more locations can comprise, for example, querying the CDN and/or the affiliate system to determine locations where the content is available. In another example, identifying 510 the one or more locations can be based on location information maintained by the client. For example, the content provider and/or affiliate may periodically, upon request, or on the occurrence of an event, push information identifying content locations to the clients which in turn can save such information for use in identifying content locations.

Once the network connection(s) have been determined 505 and the content locations have been identified 510, the client can determine 515 a cost to the CDN of delivering the selected content from each of the identified locations. Determining the cost can comprise applying a rule base logic and/or other algorithms to the information defining and/or identifying the locations for the content, predefined information identifying the bandwidth cost associated with obtaining the content from each location, the agreement between the content provider and the affiliate and information identifying the affect of such an agreement on costs, and/or other possible criteria or information.

Once the cost of retrieving the content from each of the identified locations has been determined 515, the client can select and request 520 the content from the location that causes the least cost to be incurred by the CDN. This can comprise the client requesting 520 the content from the CDN as described above with reference to FIG. 3 or from an affiliate as described above with reference to FIG. 4

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for managing bandwidth usage of a content provider, the system comprising:
    a content provider system adapted to maintain and provide content;
    a first affiliate system comprising an affiliate network and an affiliate server communicatively coupled with the affiliate network; and
    a client device maintaining information:
        identifying locations for the content,
        identifying a bandwidth cost charged by the first affiliate system to the content provider associated with the client device obtaining the content from each location, and
        defining an agreement between the content provider and the first affiliate system, and wherein the client device includes a set of instructions which cause the client device to selectively request the content from either the content provider system or the affiliate server of the first affiliate system based on at least:
            the locations for the content,
            the bandwidth cost charged by the first affiliate system to the content provider, and
            the agreement between the content provider and the first affiliate system.

2. The system of claim 1, wherein the first affiliate system maintains a copy of the content and the client requests the content from the affiliate server of the first affiliate system if the client is connected with the affiliate network of the first affiliate system.

3. The system of claim 1, wherein the client requests the content from the content provider if the client is connected with a network other than the affiliate network.

4. The system of claim 1, further comprising a second affiliate system comprising an affiliate network and an affiliate server communicatively coupled with the affiliate network and maintaining a copy of the content.

5. The system of claim 4, wherein the client requests the content from the affiliate server of the second affiliate system if the client is connected with the affiliate network of the second affiliate system.

6. The system of claim 4, wherein the client requests the content from the affiliate server of the second affiliate system if the client is connected with a network other than the affiliate network of the first affiliate system.

7. The system of claim 4, wherein the client requests the content from the content provider system if the client is connected with a network other than the affiliate network of the first affiliate system.

8. The system of claim 4, wherein the client requests the content from the content provider system if the client is connected with a network other than the affiliate network of the first affiliate system and the affiliate network of the second affiliate system.

9. A method of managing bandwidth usage of a content provider, the method comprising:
    maintaining information at a client device, the information:
        identifying locations for content and a bandwidth cost charged by an affiliate to the content provider associated with the client device obtaining the content from each location, and
        defining an agreement between the content provider and the affiliate;
    selecting with the client device a location for retrieving content based on at least:
        the locations for content,
        the bandwidth cost charged by the affiliate to the content provider, and
        the agreement between the content provider and the affiliate; and
    retrieving the content with the client device from the selected location.

10. The method of claim 9, wherein the location comprises a content provider system.

11. The method of claim 9, further comprising prior to identifying the location for retrieving the content, caching a copy of the content on an affiliate server of an affiliate system.

12. The method of claim 11, wherein the location comprises the affiliate server of the affiliate system.

13. The method of claim 9, wherein identifying the location for retrieving content further comprises:
   determining with the client device one or more current network connections;
   identifying with the client device a plurality of locations of the content based on the maintained information;
   determining with the client device a bandwidth cost to the content provider of retrieving the content from each of the plurality of locations based on the maintained information; and
   retrieving the content with the client device from the location having the least bandwidth cost to the content provider.

14. The method of claim 13, retrieving the content from the location having the least bandwidth cost to the content provider comprises retrieving the content from a content provider system.

15. The method of claim 13, retrieving the content from the location having the least bandwidth cost to the content provider comprises retrieving the content from a content provider system via an affiliate system.

16. The method of claim 13, retrieving the content from the location having the least bandwidth cost to the content provider comprises retrieving the content from an affiliate server of an affiliate system.

17. A non-transitory machine-readable medium having stored thereon a series of instructions which, when executed by a processor, cause the processor to manage bandwidth usage of a content provider by:
   maintaining the information at the client device, the information:
      identifying locations for content and a bandwidth cost charged by an affiliate to the content provider associated with the client device obtaining the content from each location, and
      defining an agreement between the content provider and the affiliate;
   selecting with the client device a location for retrieving content based on at least:
      the locations for content,
      the bandwidth cost charged by the affiliate to the content provider, and
      the agreement between the content provider and the affiliate; and
   retrieving the content with the client device from the selected location.

18. The non-transitory machine-readable medium of claim 17, wherein the location comprises a content provider system.

19. The non-transitory machine-readable medium of claim 17, further comprising prior to identifying the location for retrieving the content, caching a copy of the content on an affiliate server of an affiliate system.

20. The non-transitory machine-readable medium of claim 19, wherein the location comprises the affiliate server of the affiliate system.

21. The non-transitory machine-readable medium of claim 17, wherein identifying the location for retrieving content further comprises:
   determining with the client device one or more current network connections;
   identifying with the client device a plurality of locations of the content based on the maintained information;
   determining with the client device a bandwidth cost to the content provider of retrieving the content from each of the plurality of locations based on the maintained information; and
   retrieving the content with the client device from the location having the least bandwidth cost to the content provider.

22. The non-transitory machine-readable medium of claim 21, retrieving the content from the location having the least bandwidth cost to the content provider comprises retrieving the content from a content provider system.

23. The non-transitory machine-readable medium of claim 21, retrieving the content from the location having the least bandwidth cost to the content provider comprises retrieving the content from a content provider system via an affiliate system.

24. The non-transitory machine-readable medium of claim 21, retrieving the content from the location having the least bandwidth cost to the content provider comprises retrieving the content from an affiliate server of an affiliate system.

* * * * *